US012785388B2

(12) United States Patent
Sasaridis et al.

(10) Patent No.: US 12,785,388 B2
(45) Date of Patent: Nov. 3, 2026

(54) BACKUP SPLICE FOR ISLANDING

(71) Applicant: Base Power, Inc., Austin, TX (US)

(72) Inventors: Constantine John Sasaridis, Austin, TX (US); Adam Charles Lydecker, Buda, TX (US)

(73) Assignee: Base Power, Inc., Austin, TX (US)

( * ) Notice: Subject to any disclaimer, the term of this patent is extended or adjusted under 35 U.S.C. 154(b) by 165 days.

(21) Appl. No.: 18/902,491

(22) Filed: Sep. 30, 2024

(65) Prior Publication Data

US 2026/0095048 A1 Apr. 2, 2026

(51) Int. Cl.

| | |
|---|---|
| ***H02J 3/0012*** | (2026.01) |
| ***H02J 3/38*** | (2006.01) |
| ***H02J 3/388*** | (2026.01) |
| *H02J 101/24* | (2026.01) |
| *H02J 101/28* | (2026.01) |
| *H02J 101/40* | (2026.01) |
| *H02J 105/12* | (2026.01) |

(52) U.S. Cl.

CPC ............ *H02J 3/0012* (2020.01); *H02J 3/381* (2013.01); *H02J 3/388* (2020.01); *H02J 2101/24* (2026.01); *H02J 2101/28* (2026.01); *H02J 2101/40* (2026.01); *H02J 2105/12* (2026.01)

(58) Field of Classification Search

CPC ..... H02B 1/04; H02J 3/38; H02J 3/388; H02J 3/00; H02J 3/0012; H02J 3/381; H02J 2101/24; H02J 2101/40; H02J 2105/12

USPC ...................................................... 361/62–69

See application file for complete search history.

(56) References Cited

U.S. PATENT DOCUMENTS

| | | | | |
|---|---|---|---|---|
| 2018/0131226 | A1* | 5/2018 | Narla | H02J 3/381 |
| 2020/0091726 | A1* | 3/2020 | Bhowmik | G05F 1/67 |
| 2022/0123588 | A1* | 4/2022 | Phillips | H02J 9/062 |
| 2023/0246479 | A1 | 8/2023 | Evans et al. | |
| 2024/0429717 | A1* | 12/2024 | Schroeder | H02J 13/12 |

* cited by examiner

*Primary Examiner* — Danny Nguyen

(74) *Attorney, Agent, or Firm* — FIG. 1 Patents

(57) ABSTRACT

A backup-splice system for anti-islanding includes a wire cutter that severs a main service line within a main electrical panel of a residential unit to disconnect a microgrid from a power grid. Multiple splices provide an electrical connection on the main service line on each side of the wire cutter. A relay closes to enable the electrical connection along the main service line through the splices and opens to disconnect one or more distributed energy resources from the power grid. A controller opens the relay in response to detecting a power outage in the power grid, thereby preventing islanding of the microgrid. The backup-splice system is installed within the main electrical panel upstream of a main breaker and downstream of an electrical meter, avoiding modifications to utility-owned equipment outside the main electrical panel.

20 Claims, 8 Drawing Sheets

BACKUP SPLICE FOR ISLANDING

BACKGROUND

Anti-islanding is an important safety feature for distributed energy resources (DERs) such as solar panels, backup generators, and batteries. "Islanding" refers to a scenario in which a homeowner's DER continues to power a section of the power grid despite being disconnected from the main utility grid. This situation presents a significant safety hazard for utility line workers who may unknowingly contact live power lines. Certain industry standards, including IEEE 1547, require that DER systems connected to the utility grid must be capable of identifying a grid outage and disconnecting as a precaution.

SUMMARY

Techniques and systems for a backup splice for anti-islanding are described. In one example, a backup-splice system includes a wire cutter that severs a main service line, which extends from the electrical meter of a residential unit within the main electrical panel. The wire cutter interrupts the electricity flow along the main service line. The backup-splice system also includes two splices or taps that provide an electrical connection on each side of the wire cutter (e.g., a load-side tap and a line-side tap). The splices are electrically connected to a relay that closes to complete the electrical connection along the main service line and opens to disconnect one or more DERs in the residential unit from the power grid in response to detecting a power outage of the power grid. In this way, the described systems and techniques provide anti-islanding for a home's DER systems without requiring a local power disconnection or inconvenient coordination with local utility providers.

This Summary introduces a simplified selection of concepts described below in the Detailed Description. As such, this Summary is not intended to identify essential features of the claimed subject matter or to aid in determining its scope.

BRIEF DESCRIPTION OF THE DRAWINGS

The detailed description is described regarding the accompanying figures. Entities represented in the figures indicate one or more entities; thus, reference is made interchangeably to single or plural forms of the entities in the discussion.

DETAILED DESCRIPTION

Overview

Figure 1:
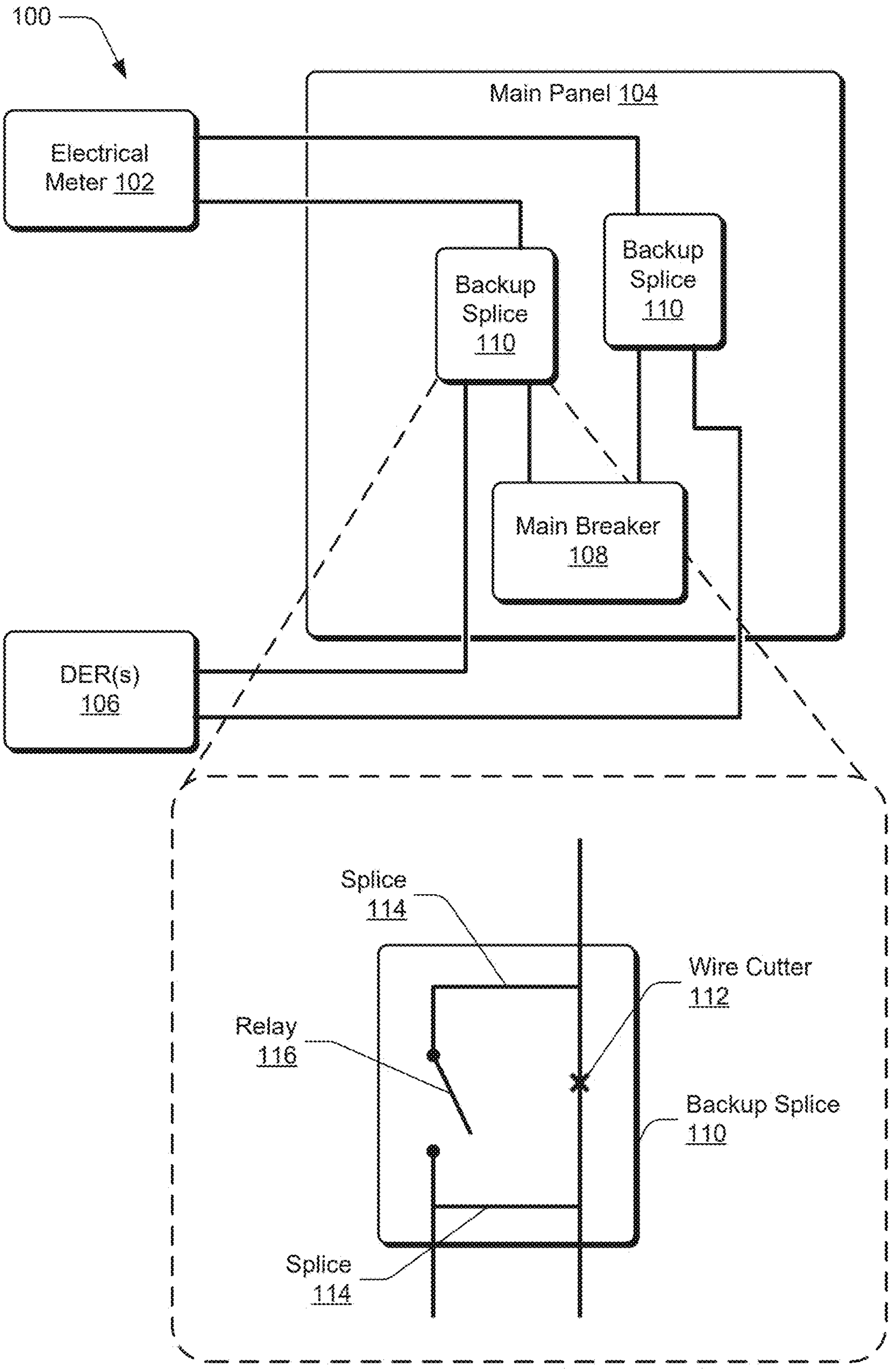
FIG. 1 illustrates an electrical environment in an example implementation that employs a backup splice for anti-islanding.

In recent years, an increasing number of microgrids (e.g., residential, commercial, and government units) have incorporated distributed energy resources (DERs) to serve as backup power (e.g., during power outages) or to utilize environmentally friendly energy sources. DERs refer to smaller, modular energy generation and storage technologies that offer microgrids alternative or additional electric capacity or energy. These alternative energy sources encompass renewable energy sources (e.g., solar panels, wind turbines, and biomass generators), energy storage (e.g., batteries, flywheels, and thermal storage), and electric vehicles capable of storing and discharging energy back to the grid.

Certain industry standards require that DER systems connected to the utility grid must be able to recognize a grid outage and disconnect as a precaution. For example, the Institute of Electrical and Electronics Engineers (IEEE) 1547 specifies several technical requirements for connecting DERs to the electric power grid to ensure their safe and reliable integration. IEEE 1547 mandates that DERs quickly and accurately detect islanding conditions and disconnect from the grid within specific timeframes after detecting islanding.

Backup switches are often used to comply with anti-islanding standards and regulations. Conventional switches are designed to break connections between microgrids and the utility grid when a grid outage occurs, preventing electrical backup systems and other DER systems from islanding. Typically, backup switches utilize an electrical relay to manage the connection to the utility grid while monitoring grid voltage to identify outages.

Some conventional backup switches utilize a gateway or separately-mounted panel box between the electrical meter and the unit's main electrical panel to manage (e.g., open and close) the connection to the grid while monitoring grid voltage to detect outages. This additional equipment involves routing additional wiring into and out of the panel box. Rerouting electrical connections through a gateway adds significant installation effort and cost, often leading to extended power outages for customers during installation.

Another conventional technique involves placing a switch between the electrical meter and the meter panel, both of which are typically owned and maintained by the local utility company. Although this approach reduces installation time and equipment cost, this technique presents challenges because utility companies control the adoption and installation of these switches in their respective territories. In practice, utility companies usually require their technicians to be present to remove and reinstall the meter panel, resulting in a coordinated power outage.

In contrast, this document describes techniques and systems for a backup splice to provide anti-islanding protection. The described backup splice taps into the main service wires within a unit's main electrical panel in two locations, severing the connection between them and rerouting the unit's power through a relay. In other words, a backup splice taps into each main service line (e.g., regularly two service lines) in two locations. The relay functions as a backup switch to prevent a unit's DER systems from islanding. A printed circuit board assembly (PCBA) attached to the relay monitors grid voltage, drives the relay, monitors the status of the relay (e.g., open or closed), and measures current through the relay.

The described backup splice uses a tap connection (e.g., an insulation-piercing connector), which generally connects to the main power lines supplying electricity to a building. The tap connection allows additional equipment to draw or supply power directly from the main lines, bypassing a main service disconnect. Tap connections are easy to install, do not require service disconnection, and integrate additional power sources without extensive system modifications.

In contrast to conventional backup switches installed between the meter and the meter socket, the described backup splice is installed via a tap connection-like strategy within the main electrical panel upstream of the electrical meter. Placement in the electrical panel avoids the need to coordinate and defer to local utility companies. Depending on the chosen installation method, the use of tap connections avoids requiring power outages during installation. The described techniques and systems also result in less equipment and lower costs than conventional anti-islanding techniques by avoiding additional electrical enclosures near the electrical panel (e.g., on a homeowner's wall). The lineside-tap approach also avoids rerouting service wires, allowing alternate power sources (e.g., batteries) to use smaller wires than service lines, resulting in smaller and less costly electrical wiring to the alternate power source.

The following discussion describes an example environment that employs the techniques described herein. Example procedures are also described as performable in the example environment and other environments. Consequently, the performance of the example procedures is not limited to the example environment, and the example environment is not limited to the performance of the example procedures.

Example Electrical Environment

FIG. 1 illustrates an electrical environment 100 in an example implementation that employs a backup splice for anti-islanding. The illustrated electrical environment 100 includes an electrical meter 102, a main panel 104, and one or more DERs 106 that are electrically coupled, one to another, via electrical wires or lines. Electrical environment 100 is illustrative of electrical configurations for microgrids, such as residential units (e.g., homes, duplexes, townhouses, apartments, condominiums) and commercial units (e.g., office buildings, retail spaces). Electrical configurations for the electrical meter 102, main panel 104, and DERs 106 are configurable in various ways. For example, the electrical meter 102 is directly connected to the main panel 104, with the one or more DERs 106 connected in parallel to the main panel 104.

The electrical meter 102 is typically found on the exterior of a building, including residential units and commercial units, and measures the amount of electricity used by the occupants (e.g., homeowner). Electrical meters 102 are provided by the local power or utility company to track energy usage in kilowatt-hours. Utility companies are responsible for the power grid (e.g., power stations, power lines, substations) up to and including the electrical meter 102, which means any service, repair, or alterations to the electrical meter 102 or power lines coupling the electrical meter 102 to the grid are controlled and (usually) performed by the utility company. Unit owners, such as homeowners, are responsible for the electrical lines upstream of the electrical meter 102 and making up the microgrid of the respective unit.

The main panel 104, also called the main electrical panel, is electrically connected to the electrical meter 102 and is the central hub for power distribution within a unit's microgrid or electrical system and is electrically connected to the electrical meter 102. Specifically, the main panel 104 receives power via the electrical meter 102 and distributes it to various circuits throughout the microgrid. In homes, the main panel 104 is often located in a garage or basement.

Equipped with circuit breakers, including a main breaker 108, the main panel 104 protects against electrical overloads and short circuits in the microgrid. Each breaker controls a specific group of outlets or appliances, allowing for targeted power shutoff in the microgrid when necessary. For example, the main breaker 108 is a safety device that acts as a switch to control the entire electrical supply to the respective microgrid. When the total electrical load exceeds the breaker's capacity, the main breaker 108 automatically trips, cutting off power to the entire microgrid, ensuring safety during electrical emergencies.

As described above, DERs 106 include solar panels, battery storage, and electric vehicles that allow homeowners and unit owners to generate, store, and manage their electricity. Each DER 106 is electrically connected to the main panel 104 to receive or provide electrical power to the microgrid. DERs 106 generally enhance energy independence and lower energy costs of a microgrid by reducing reliance on the traditional power grid. For example, DERs 106 can provide backup power during outages, ensuring continued comfort and safety for the unit's occupants.

In the illustrated electrical environment 100, each DER 106 is electrically connected to the electrical meter 102 and the main breaker 108 (or another breaker of the main panel 104) via a backup splice 110. In FIG. 1, a backup splice 110 is located along each service line or electrical wire between the electrical meter 102 and the main breaker 108. In other implementations, the backup splice 110 is located in alternative locations (e.g., downstream of the main breaker 108) within the microgrid.

The backup splice 110 provides anti-islanding for each DER 106 by disabling or breaking the connection to the power grid (e.g., via the electrical meter 102) in response to a grid outage. The backup splice 110 includes a wire cutter 112, multiple splices 114, and a relay 116 as illustrated in the bottom portion of FIG. 1. In other implementations, the backup splice 110 includes additional components (e.g., control mechanisms, communication mechanisms).

The wire cutter 112 provides an interruption (e.g., as illustrated by the cross) in the conductive path (e.g., electrical wire) between the electrical meter 102 and the main breaker 108, preventing electricity from flowing along this wire. As a result, electricity flows from or to the grid when the relay 116 is closed. Relay 116 is an electrically operated switch that can isolate the DERs 106 from the power grid. Techniques for introducing wire cutter 112 without creating an arc in the live wire are described in relation to FIG. 3. In other implementations, a busbar instead of relay 116 is used to connect the splices 114 (e.g., a line-side tap and a load-side tap of the main service line). In scenarios where the backup splice 110 is removed or replaced, a busbar is added between the two taps to bypass the relay 116.

Splices 114 are connections made on both sides of wire cutter 112 to extend the electrical circuit to relay 116. Splices 114 are introduced using tap connections to the electrical line between the electrical meter 102 and main breaker 108 on each side of wire cutter 112. Splices 114 integrate the DERs 106 into the unit's microgrid, allowing them to draw or supply power directly from the unit's main electrical lines and bypassing the main service disconnect provided by the main breaker 108. For example, the splices 114 allow excess power generated by solar panels to be fed back into the power grid or batteries to provide power to a microgrid during power outages.

Like conventional backup switches, the backup splices 110 provide anti-islanding for a unit's DERs 106. However, the backup splices 110 are generally installed using a lineside-tap technique in the main panel 104 to avoid the local utility company's jurisdiction and disconnection of the unit's power during installation.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Backup Splice

Figure 2:
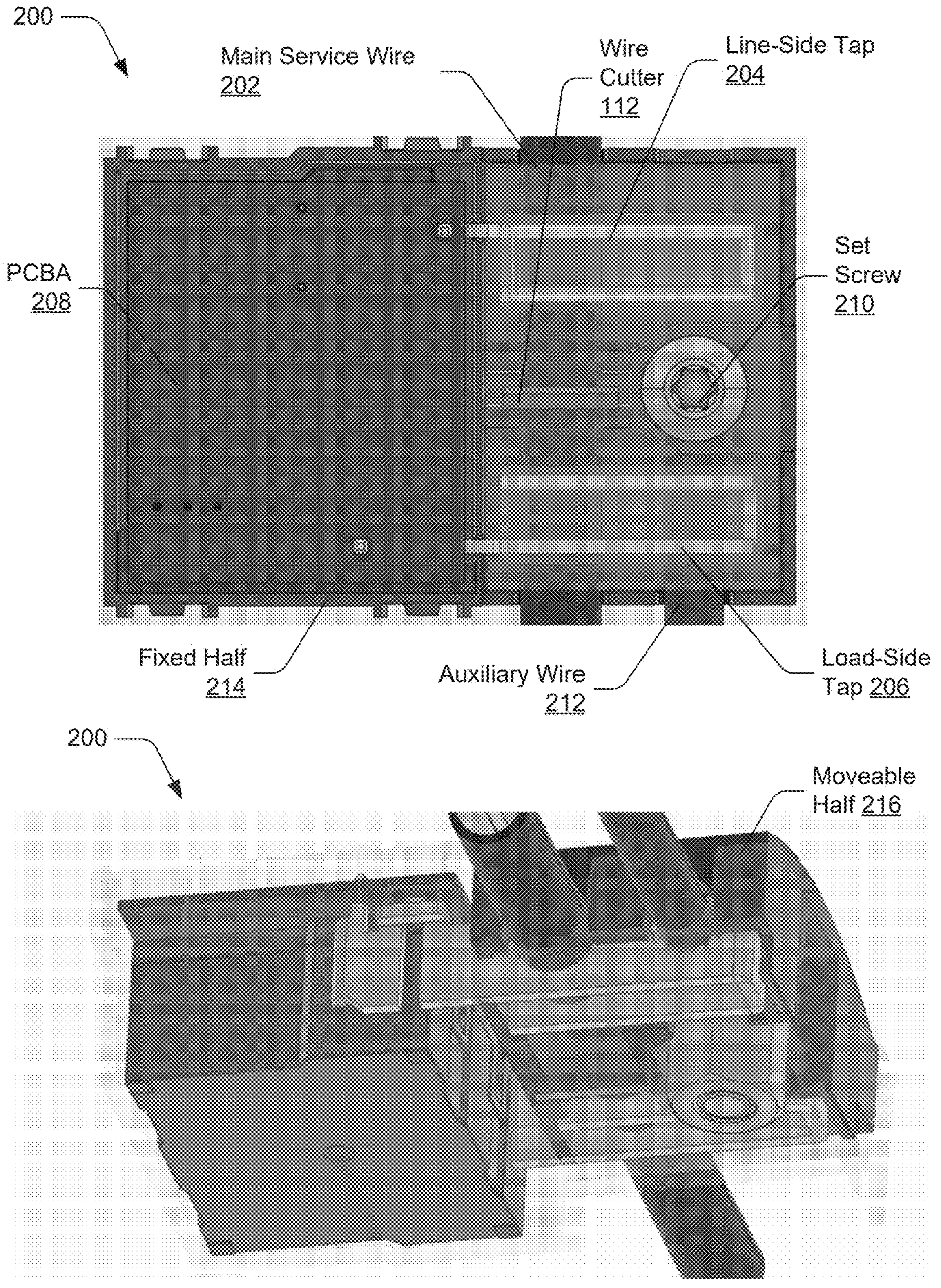
FIG. 2 depicts a system in an example implementation that shows the configuration of a backup splice of FIG. 1 in greater detail, employing the techniques described herein.

FIG. 2 depicts a top view and a bottom perspective view of a system 200 or an apparatus in an example implementation that shows the configuration of a backup splice 110 of FIG. 1 in greater detail, employing the techniques described herein. The backup splice 110 is configurable to provide anti-islanding of one or more DERs 106 electrically integrated into a home or other unit's microgrid. As illustrated in FIG. 2, the backup splice 110 is installed on a main service wire 202, which is directly or indirectly connected to the electrical meter 102. To provide the described anti-islanding techniques, the backup splice 110 employs the wire cutter 112, a line-side tap 204, a load-side tap 206, a PCBA 208, and a set screw 210.

As described above, the backup splice 110 taps into the main service wire 202 (or multiple main service wires 202) in two locations (e.g., the line-side tap 204 and the load-side tap 206), severs the connection between the two taps, and reroutes the electricity from the main service wire 202 through the relay 116 (not illustrated in FIG. 2). In other implementations, a single backup splice 110 is used for two or more service lines from the electrical meter 102 (e.g., L1 and L2 wires in a three-phase system), with a single PCBA 208 and a two-pole relay instead of a duplicate setup for each pole. In yet other implementations, two main service wires 202 (e.g., L1 and L2) have a single PCBA 208 on either main service wire 202 and the PCBA 208 connects via a harness to the other backup splice 110.

The line-side tap 204 is located closer to the electrical meter 102 and the power grid than the load-side tap 206, which is located closer to the one or more DERs 106, the main breaker 108, and other loads of the residential unit. The load-side tap 206 also includes a line-side tap or splice into an auxiliary wire 212, electrically connected to the DERs 106. In this way, the backup splice 110 allows the DERs 106 to connect to the load-side tap 206 directly via the auxiliary wire 212.

The line-side tap 204 and the load-side tap 206 are generally made by pressing metal or conductive teeth through the insulation around the main service wire 202 and the auxiliary wire 212 and into electrical contact with the conductive material thereof. The use of insulation-piercing teeth avoids the need to remove the insulation prior to installing the backup splice 110. In other implementations, the line-side tap 204 and the load-side tap 206 use lugs to apply pressure and electrically connect to the main service wire 202 (and the auxiliary wire 212) via a set screw or similar mechanism. The auxiliary wire 212 and the load-side tap 206 of the main service wire 202 are electrically connected using a busbar or other conductive path.

The wire cutter 112 is a blade or similar component that severs the main service wire 202 between the line-side tap 204 and load-side tap 206. The wire cutter 112 is made of non-conductive material (e.g., ceramic) to isolate the two sides of the main service wire 202. In other implementations, the wire cutter 112 has a different shape or material suitable to sever and isolate the main service wire 202 within the backup splice 110.

The tap portion of the backup splice 110 includes a fixed half 214 and a moveable half 216. The set screw 210 passes through the moveable half 216 and screws into the fixed half 214 to fasten and align the two halves together. The fixed half 214 and the moveable half 216 are substantially or mostly formed or made of high-temperature rated and rigid plastic (or other nonconductive material).

The installation process for the backup splice 110 includes inserting the main service wire 202 through a first slot in the fixed half 214 and the auxiliary wire 212 through a second slot. As illustrated in FIG. 2, the main service wire 202 extends through two sides of the fixed half 214, while the auxiliary wire 212 passes through a single side of the fixed half 214 (on the load side). The moveable half 216 is then positioned and aligned over the fixed half 214 using the set screw 210. The set screw 210 engages the fixed half 214 to fasten the line-side tap 204 into the main service wire 202 and the load-side tap 206 into the main service wire 202 and the auxiliary wire 212. As the moveable half 216 is fastened into the fixed half 214, the wire cutter 112 severs the main service wire 202 between the two taps. In other implementations, backup splice 110 includes a single assembly that opens to insert the main service wire 202 and the auxiliary wire 212 and closes to create the line-side tap 204 and the load-side tap 206.

The backup splice 110 reroutes electricity from the line-side tap 204 through the relay 116 to the load-side tap 206 (or vice-versa). The relay 116 then acts as a backup switch for anti-islanding. A printed circuit board assembly (PCBA) 208 is attached to the relay 116. The PCBA 208 is configured to monitor the grid voltage, drive the relay 116, monitor the status of the relay 116 (e.g., open or closed), and measure the current through the relay 116. An external override (e.g., a button on the outside of the main panel or the backup splice 110) is configured to command or control the backup splice 110 to close the relay 116 and reconnect the microgrid to the power grid.

The backup splice 110 draws power directly from the main service wire 202 to power the PCBA 208. The PCBA 208 monitors the status of the power grid using voltage taps on the line side and load side of the relay 116. In addition, the PCBA 208 includes or is connected to a hall effect sensor, current transformer, shunt, or similar circuitry to provide current sensing and revenue-grade metering for the power through the relay 116.

The PCBA 208 is also communicatively coupled to additional components in the microgrid. In particular, the backup splice 110 is able to communicate with an external power supply (e.g., backup batter or generator) and direct it to provide electricity to the unit's microgrid in response to the power grid outage. In addition, the PCBA 208 can provide control signs (e.g., low-voltage control signals) to connect or disconnect (e.g., via a relay or switch system) one or more loads in response to the grid outage.

In an alternative implementation, the PCBA 208 and relay 116 are external to the main panel 104. The wire cutter 112 with the line-side tap 204 and the load-side tap 206 are inside the main panel 104, but the splices 114 from the two taps are rerouted to an external device that functions as the relay 116. Such communication to the external device is performed using power line communication or controller area network (CAN) communication.

Figure 3:
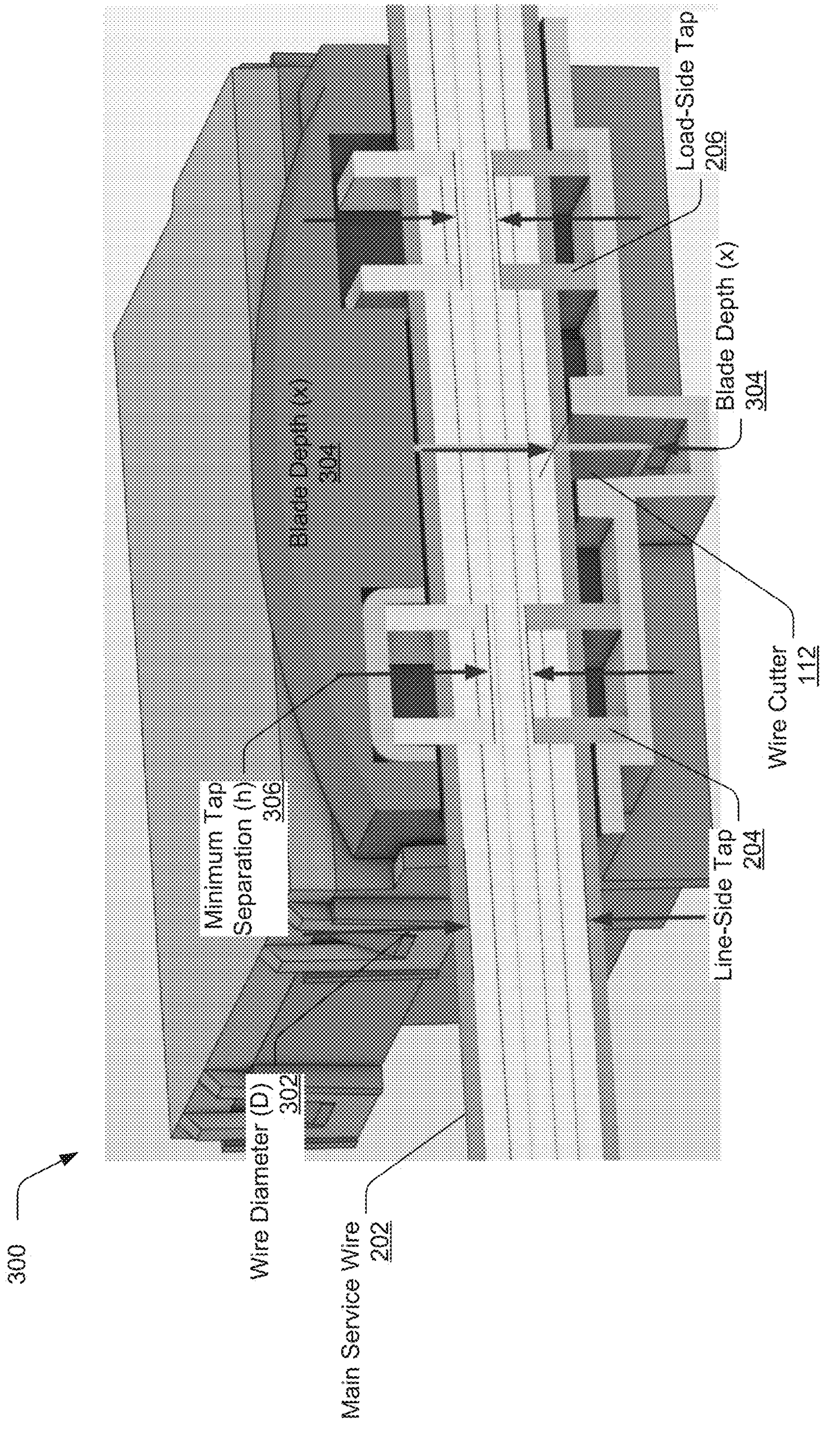
FIG. 3 depicts a cross-section view of a system in an example implementation showing the taps into and severing the main service wire, employing the techniques described herein.

FIG. 3 depicts a cross-section view of a system 300 in an example implementation showing the taps into and severing of the main service wire, employing the techniques described herein. The cross-section view illustrates that the main service wire 202 includes a wire diameter (D) 302, which does not include the insulation thereon. The cross-section view also illustrates the wire cutter 112, the line-side tap 204, and the load-side tap 206.

To prevent arcing across the severed sides of the main service wire 202 without additional components, the backup splice 110 is configured to maintain a specified blade depth (x) 304, which is the distance the wire cutter 112 extends through and past the opposite side of the main service wire 202, and a minimum tap separation (h) 306, which represents the minimum distance between the teeth or other tapping mechanisms of the line-side tap 204 and the load-side tap 206. Specifically, the blade depth 304 is greater than the minimum creepage required for compliance with regulatory requirements. In addition, the blade depth 304 is less than the difference between the wire diameter 302 and the minimum tap separation 306 (e.g., $x<D-h$) to ensure that the taps connect with the main service wire 202.

The blade depth 304 and minimum tap separation 306 are configured to allow for variances in manufacturing and installation processes. In some implementation, the moveable half 216 is designed to accommodate various wire sizes for main panel ampacities. In other implementations, different versions of the moveable half 216 are designed for different wire sizes. Arcing across the wire cutter 112 is prevented by ensuring the line-side tap 204 and the load-side tap 206 connect to the main service wire 202 before the wire cutter 112 severs the main service wire 202, allowing the backup splice 110 to be installable on live service wires.

Another strategy to prevent arcing in the installation process of the backup splice 110 on live wires is to have the line-side tap 204 and the load-side tap 206 driven at the same starting height as the wire cutter 112. This configuration uses a break-away or similar component on a separate body (e.g., the fixed half 214), which drives the line-side tap 204 and the load-side taps 206 into place (e.g., the taps connect to the main service wire 202), and the break-away component disconnects or fails. The line-side tap 204 and the load-side tap 206 finish engaging at the end of the fastener-drive (e.g., set screw 210) process. This alternative configuration includes additional parts but provides a more flexible design for a larger range of wire gauges. The break-away component is designed to break at less than the force required to install the line-side tap 204 and the load-side tap 206 fully and not create any loose parts that obstruct the closing of the backup splice.

Figure 4:
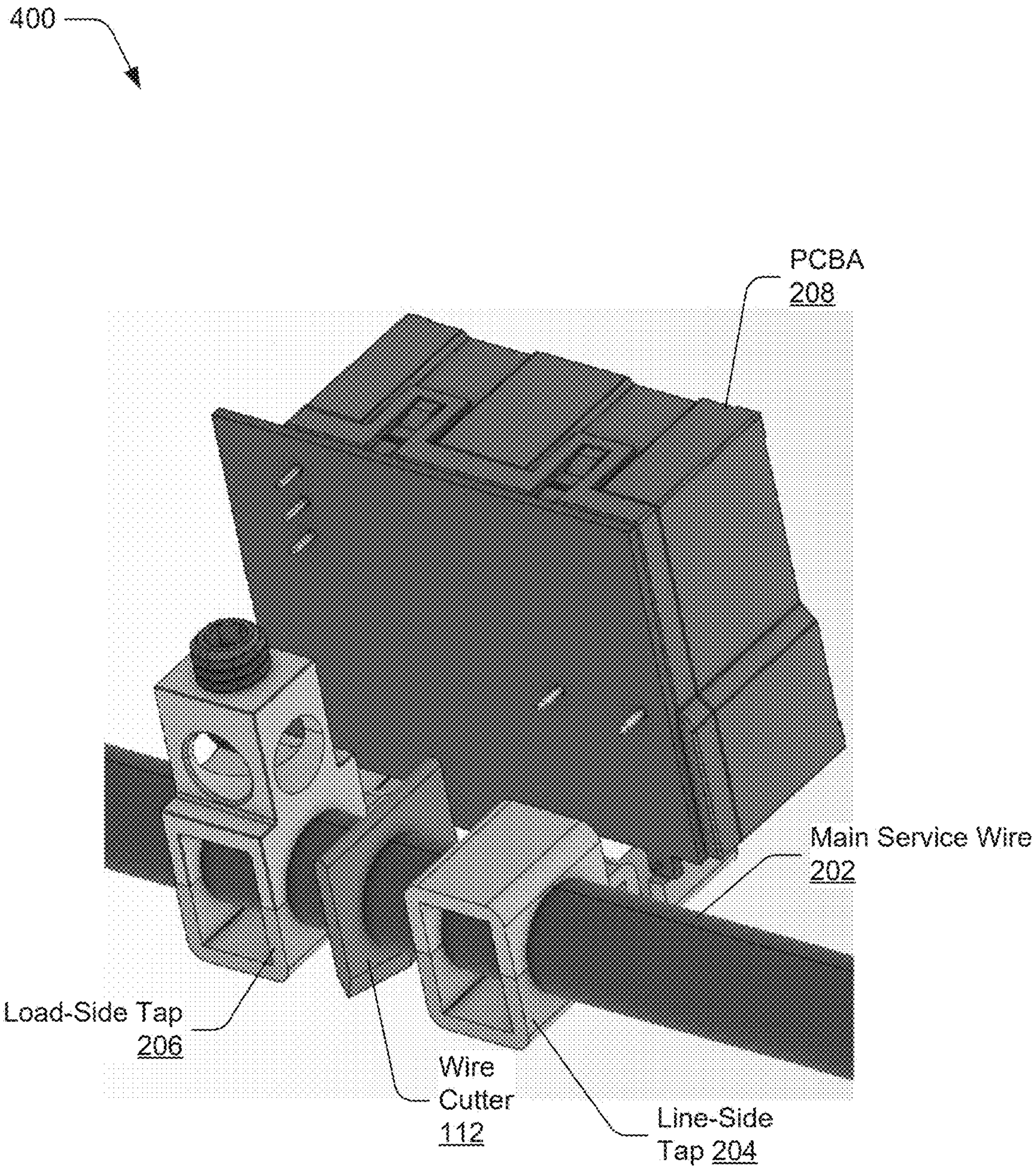
FIG. 4 depicts a system in another example implementation that shows the configuration of a backup splice of FIG. 1 in greater detail, employing the techniques described herein.

FIG. 4 depicts a system 400 in another example implementation that shows the configuration of a backup splice 110 of FIG. 1 in greater detail, employing the techniques described herein. As described above, the system 400 is configurable to provide anti-islanding of one or more DERs 106 electrically integrated into a home or other unit's microgrid. As illustrated in FIG. 4, the system 400 is installed on a main service wire 202, which is directly or indirectly connected to the electrical meter 102. To provide the described anti-islanding techniques, the backup splice 110 employs the wire cutter 112, the line-side tap 204, the load-side tap 206, and the PCBA 208. The system 400 is similar to system 200 of FIG. 2, but changes the angle of the PCBA 208 and relay 116 in relation to the line-side tap 204 and the load-side tap 206. In particular, the PCBA 208 and relay 116 are positioned orthogonal to the taps to provide better spacing for some main panel configurations.

As describe above, the system 400 taps into the main service wire 202 (or multiple main service wires 202) in two locations (e.g., the line-side tap 204 and the load-side tap 206), severs the connection between the two taps, and reroutes the electricity from the main service wire 202 through the relay 116 (not illustrated in FIG. 4). The line-side tap 204 is located closer to the electrical meter 102 and the power grid than the load-side tap 206, which is located closer to the one or more DERs 106 and the main breaker 108. The load-side tap 206 also includes a line-side tap or splice into an auxiliary wire (not illustrated in FIG. 4) above the tap for the main-service wire to reduce spacing requirements for system 400 further. In addition, the load-side tap 206 allows for multiple ingress angles of the auxiliary wire 212 to provide greater flexibility in connecting the DER 106.

Example Procedures for Installing a Backup Splice

The following discussion describes remote fitting techniques that are implementable utilizing the described systems and devices. Aspects of each procedure are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions, thereby creating a special-purpose machine for carrying out an algorithm as illustrated by the flow diagram. As a result, the instructions are stored on a computer-readable storage medium that causes the hardware to perform the algorithm, e.g., responsive to the execution of the instructions. In portions of the following discussion, reference will be made to FIGS. 1-4.

Figure 5:
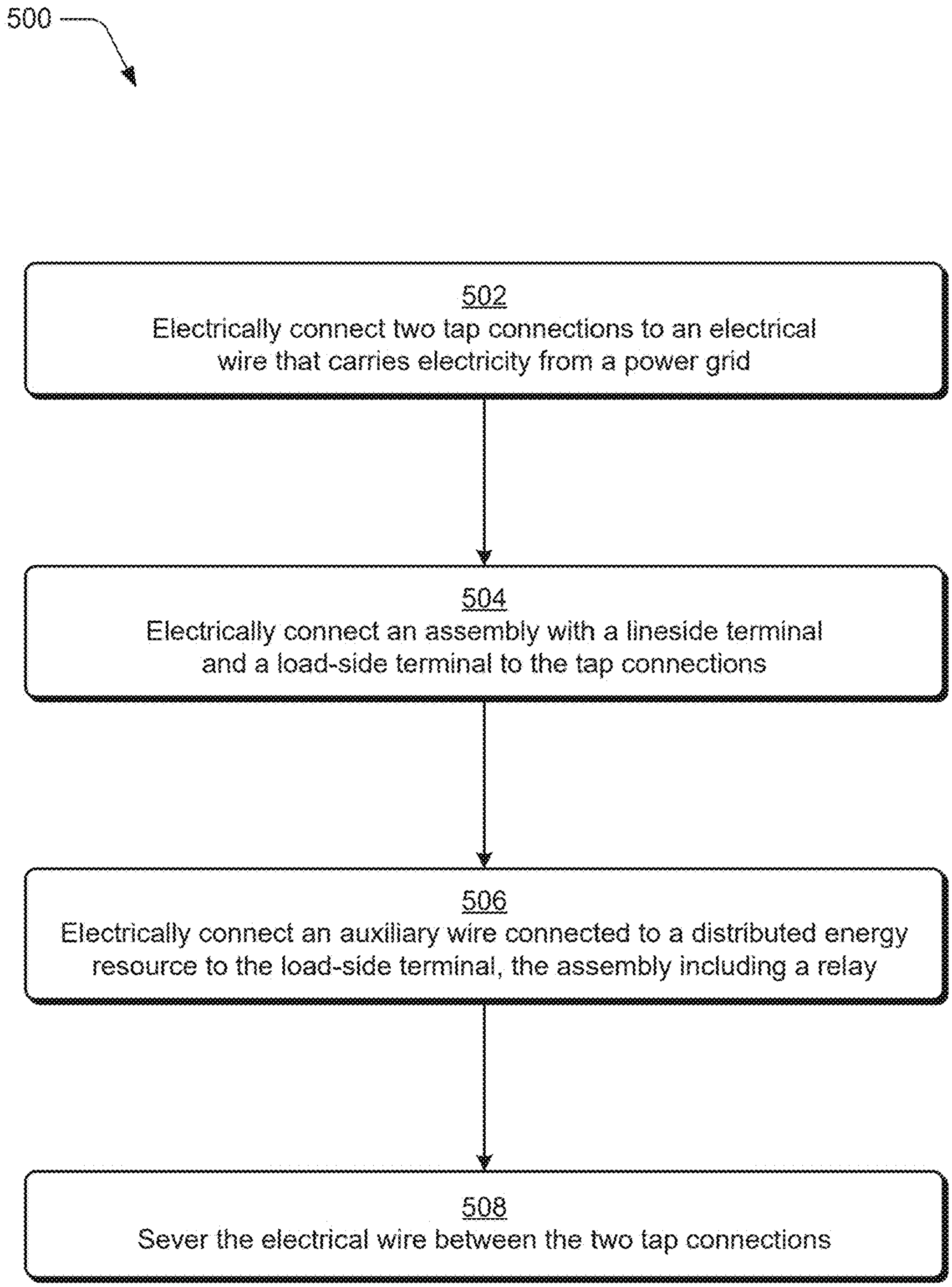
FIG. 5 is a flow diagram depicting an algorithm as a step-by-step procedure in an example implementation of operations performable for installing a backup splice for anti-islanding.

FIG. 5 is a flow diagram depicting an algorithm as a step-by-step procedure 500 in an example implementation of operations performable for installing a backup splice for anti-islanding. To begin, two tap connections are electrically connected or made to an electrical wire that carries electricity from a power grid (block 502). For example, the electrical wire includes multiple main service lines electrically connecting an electrical meter of a residential unit to a breaker circuit. An assembly with a lineside terminal and a load-side terminal is electrically connected to the tap connections. The assembly is installed near a main electrical panel of the residential unit.

An auxiliary wire connected to a DER is electrically connected to the load-side terminal of the assembly (block 506). The assembly includes a relay that closes to enable the electrical connection along the electrical wire via the assembly and opens to disconnect the DER from the power grid. The electrical wire is then severed between the two tap connections (block 508).

The assembly also includes a PCBA that monitors the status of the power grid using voltage taps on the tap connections or the combination of the lineside terminal and the load-side terminal. In response to detecting a power outage in the power grid, the PCBA causes the relay to open and disconnect the DER from the power grid.

Figure 6:
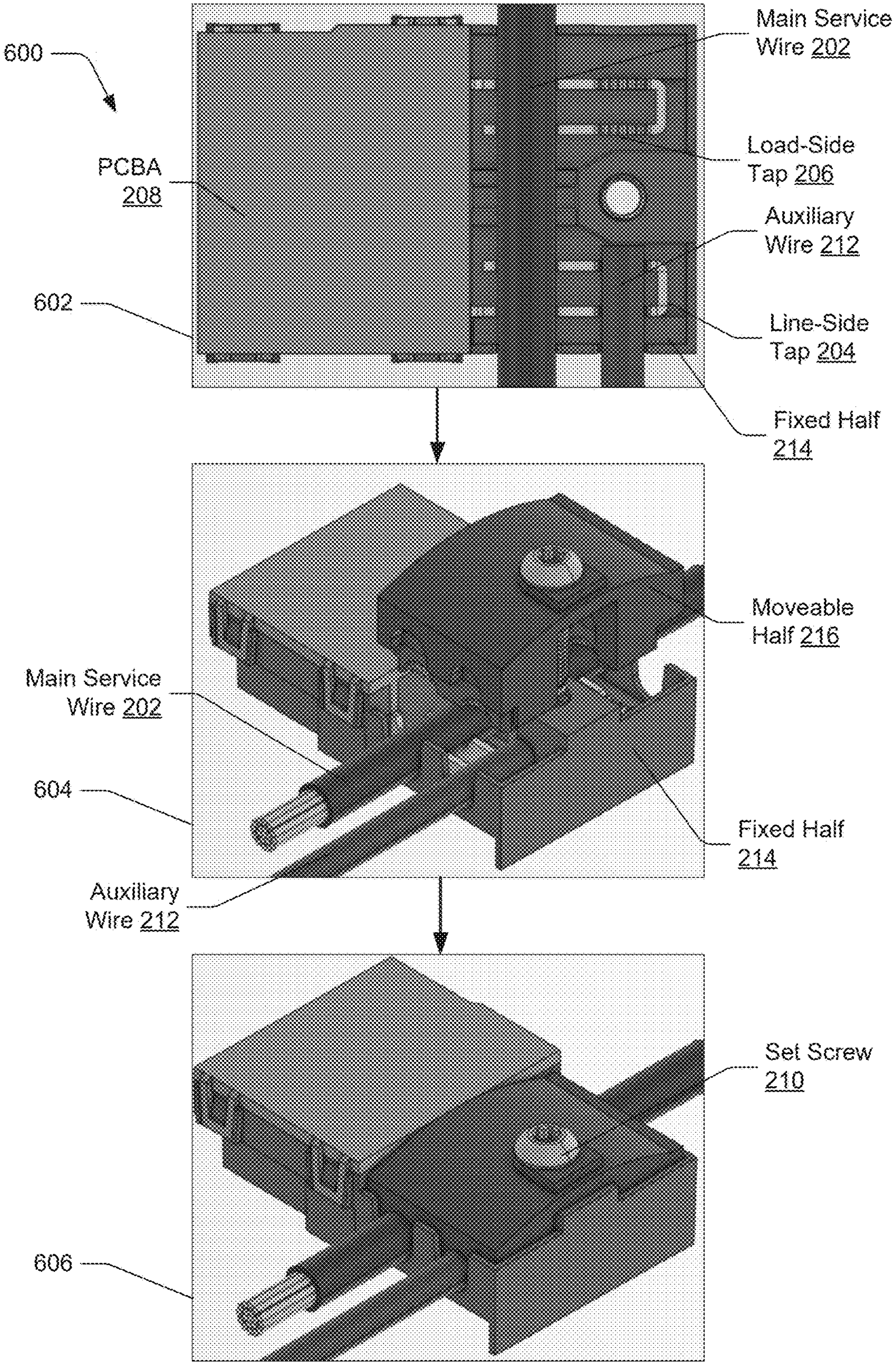
FIG. 6 depicts an example implementation of a backup splice that is installed via a step-by-step procedure.

FIG. 6 depicts an example implementation 600 of a backup splice installed via a step-by-step procedure. To begin, an assembly is inserted on a first side of an electrical wire (block 602). The electrical wire is positioned within or adjacent to multiple recesses of the assembly. For example, a fixed half 214 of the backup splice 110 is positioned under or behind the main service wire 202 so that the main service wire 202 fits within tap recesses. An auxiliary wire connected to a DER is inserted into another assembly recess (block 602). The other recess is located on the load side of the electrical wire. For example, the auxiliary wire 212 is positioned or inserted into a tap recess of the backup splice 110 on the load side of the main service wire 202.

An assembly cover is then aligned on a second side of the electrical wire to position the electrical wire and the auxiliary wire within recesses (block 604). For example, the moveable half 216 of the backup splice 110 is positioned over or in front of the main service wire 202 and the auxiliary wire 212 so that complimentary tap recesses in the moveable half 216 are opposite the tap recesses in the fixed half 214. The assembly cover is fastened via the set screw 210 to the assembly to generate a load-side tap of the electrical wire, a line-side tap of the electrical wire, and a tap of the auxiliary wire (block 606). The fastening also severs the electrical wire in between the load-side tap and the line-side tap. The assembly or the assembly cover includes a relay to break or disable the connection between the DER and a power grid on the line side of the electrical wire.

Another Example Backup Splice

Figure 7:
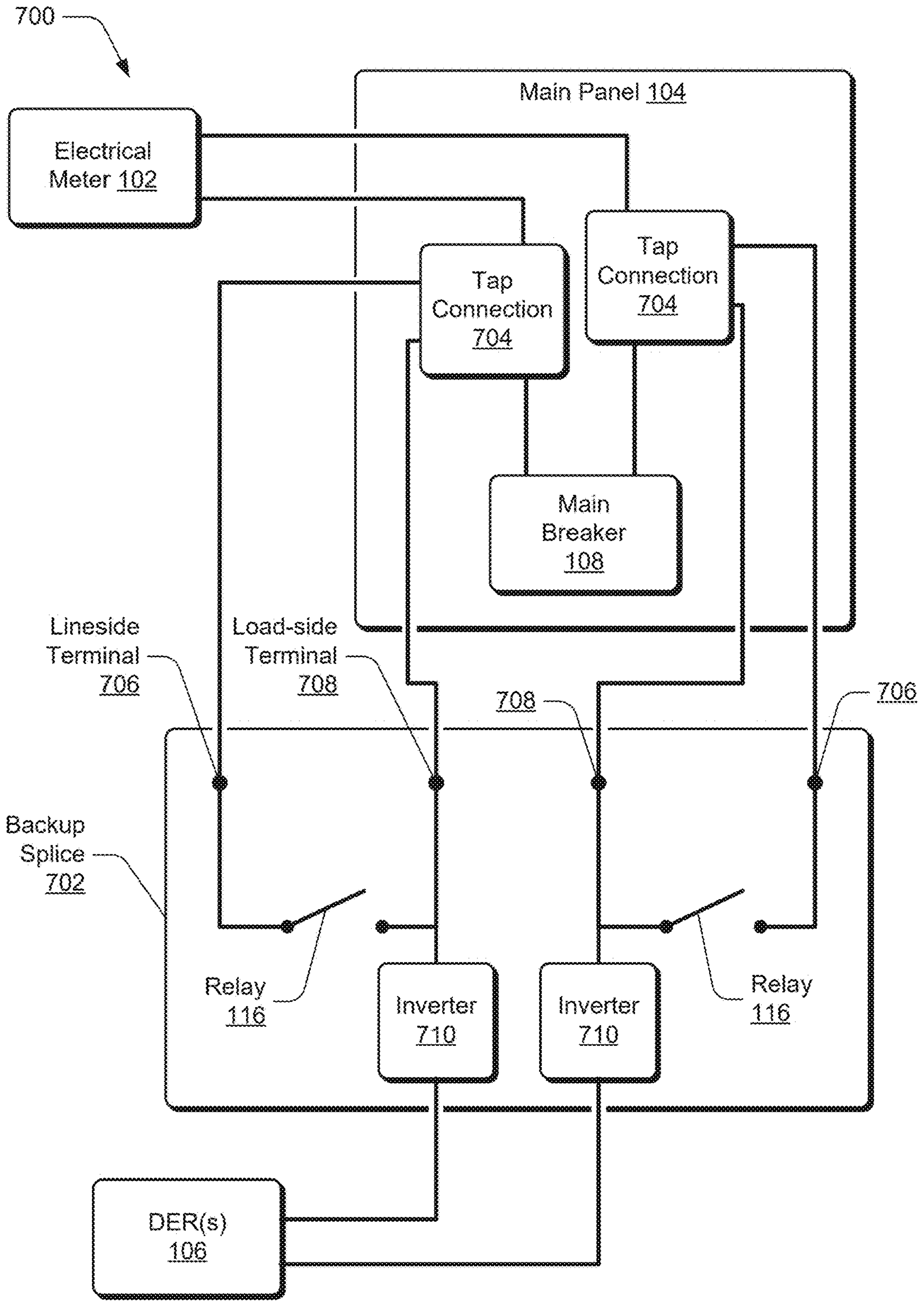
FIG. 7 illustrates an electrical environment in another example implementation that employs a backup splice for anti-islanding.

FIG. 7 illustrates an electrical environment 700 in another example implementation that employs a backup splice for anti-islanding. The illustrated electrical environment 700 includes the electrical meter 102, the main panel 104, and the one or more DERs 106 of FIG. 1 that are electrically coupled, one to another, via electrical wires or lines. Similar to electrical environment 100 of FIG. 1, Electrical environment 700 is illustrative of electrical configurations for microgrids, such as residential units (e.g., homes, duplexes, townhouses, apartments, condominiums) and commercial units (e.g., office buildings, retail spaces). Electrical configurations for the electrical meter 102, main panel 104, and DERs 106 are configurable in various ways. For example, the electrical meter 102 is directly connected to the main panel 104, with the one or more DERs 106 connected in parallel to the main panel 104.

As described above, DERs 106 include solar panels, battery storage, and electric vehicles that allow homeowners and unit owners to generate, store, and manage their electricity. In electrical environment 700, each DER 106 is electrically connected to the electrical meter 102 and the main breaker 108 of the main panel 104 via a backup splice 702 to receive or provide electrical power to the microgrid. In FIG. 7, a tap connection 704 is located along each service line or electrical wire between the electrical meter 102 and the main breaker 108. In other implementations, the tap connection 704 is located in alternative locations (e.g., downstream of the main breaker 108) within the microgrid.

The backup splice 702 provides anti-islanding for each DER 106 by disabling or breaking the connection to the power grid (e.g., via the electrical meter 102) in response to a grid outage. The backup splice 702 includes a lineside terminal 706 for each tap connection 704, a load-side terminal 708 for each tap connection 704, relays 116, and inverters 710 as illustrated in the bottom portion of FIG. 7. In other implementations, the backup splice 702 includes additional components (e.g., PCBA 208, control mechanisms, communication mechanisms).

The tap connection 704 provides two connections (e.g., a lineside connection and a load-side connection) for each service line to the backup splice. In the illustrated electrical environment 700, two service lines extend from the electrical meter 102, resulting in two tap connections 704. The lineside terminal 706 and the load-side terminal 708 are electrically connected to the corresponding connections to the service line provided by the tap connection 704. As a result, electricity flows from or to the grid when the relay 116 is closed. Relay 116 is an electrically operated switch that can isolate the DERs 106 from the power grid. When the relay 116 is closed, electricity also flows from or to the inverters 710. The inverters 710 converts alternating current (AC) into direct current (DC) and vice versa.

A cutter tool (not illustrated) interrupts the conductive path (e.g., electrical wire) between the electrical meter 102 and the main breaker 108, preventing electricity from flowing along this wire once the backup splice is installed. To prevent an arc in the live wire, a technician confirms that the relay 116 is closed before cutting or interrupting the service line.

Like the above-described backup splice 110, the backup splice 702 provides anti-islanding for a unit's DERs 106. However, the backup splice 702 is generally installed using a lineside-tap technique in the main panel 104 to avoid the local utility company's jurisdiction and disconnection of the unit's power during installation.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example System and Device

Figure 8:
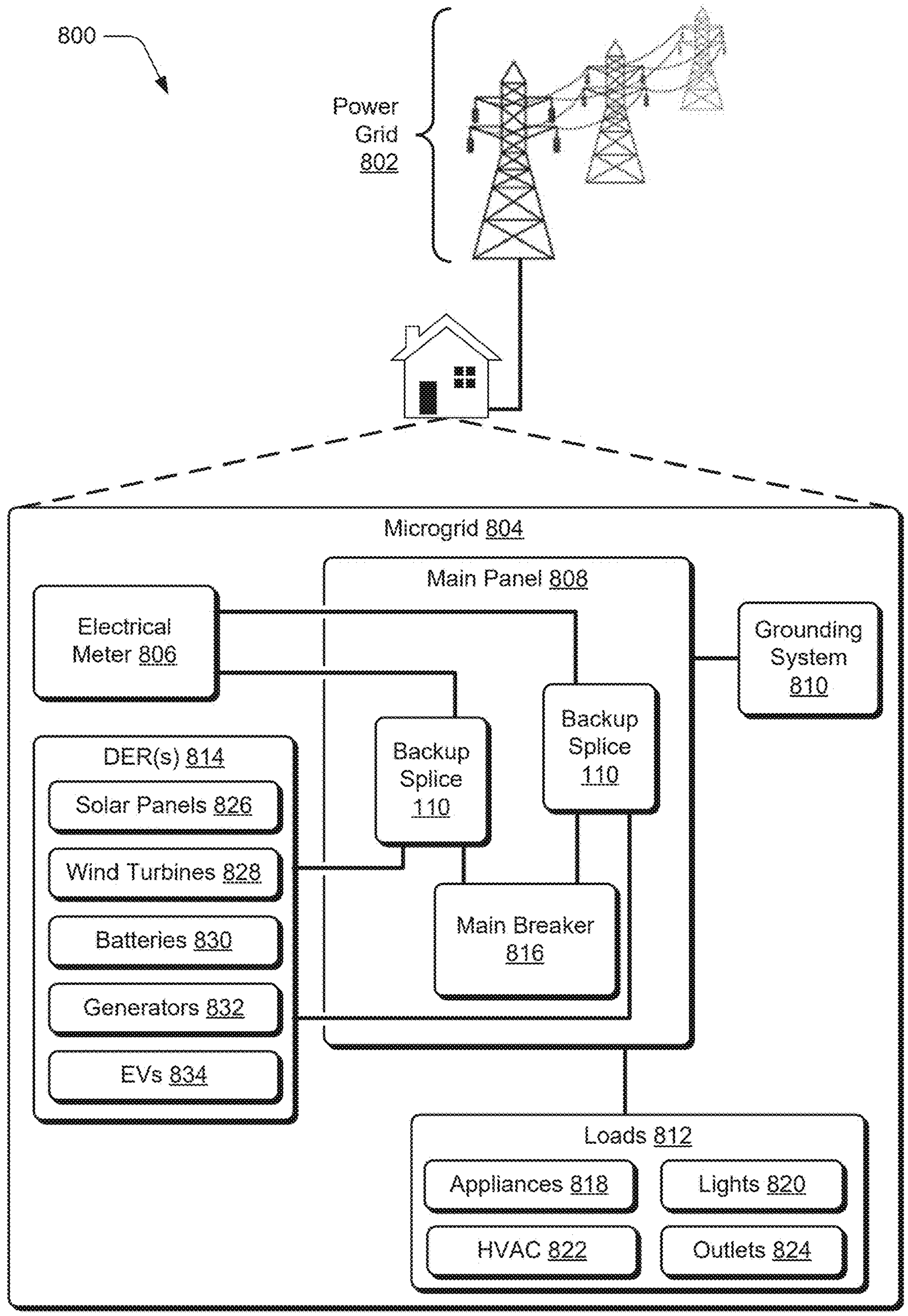
FIG. 8 illustrates an example system configured to include one or more systems to implement the techniques described herein.

FIG. 8 illustrates an example system 800 configured to include one or more systems to implement the techniques described herein. This is illustrated through the inclusion of the backup splice 110. In the illustrated example, the system 800 includes a power grid 802 that provides electricity to a microgrid 804, which includes an electrical meter 806, a main panel 808, a grounding system 810, one or more loads 812, and one or more DERs 814. The system 800 is configurable, for example, to support the microgrid 804 of residential units, commercial units, and/or other electrical systems connected to the power grid 802.

The power grid 802 is a network of interconnected transmission lines, substations, and power plants that provide electricity to homes (e.g., the microgrid 804), businesses, and industries. The transmission lines generally transport high-voltage electricity over long distances from power plants to substations. Substations reduce the electricity's voltage to one or more levels suitable for local distribution via lower-voltage distribution lines.

The microgrid 804 generally receives electricity via distribution lines from a local substation that forms part of the power grid 802. Local distribution and regulation of electricity for the microgrid 804 is provided by a local utility company. The utility company installs the electrical meter 806 at each electrified unit, including residential units or homes.

As described above, the electrical meter 806 (e.g., the electrical meter 102) is typically found on the unit's exterior and measures the amount of electricity used by the occupants (e.g., homeowner). The local utility company is responsible for the power grid up to and including the electrical meter 806. Unit owners, such as homeowners, are responsible for the electrical lines leading from the electrical meter into the microgrid 804.

The main panel 808 (e.g., the main panel 104) is the central hub for the electrical system in the microgrid 804 and is electrically connected to the electrical meter 806. The main panel 808 receives power via the electrical meter 806 and distributes it to various circuits or loads 812 throughout the microgrid 804. The main panel 808 is often located in a garage or basement.

The main panel 808 includes circuit breakers, including a main breaker 816, to protect against electrical overloads and short circuits in the microgrid 804. Each breaker controls a specific group of outlets or appliances, allowing for targeted power shutoff when necessary. For example, the main breaker 816 is a switch to control the entire electrical supply to the microgrid 804. When the electrical load exceeds the breaker's capacity, the main breaker 816 automatically trips, cutting off power to the microgrid 804 to ensure safety during electrical emergencies.

The grounding system 810 is electrically connected to a grounding bus or terminal bar within the main panel 808. The grounding system 810 provides a low-resistance path for electrical current to flow safely to the earth in case of a fault or short circuit. Grounding prevents electrical shocks and protects the microgrid's electrical system from damage.

The one or more loads 812 include devices or appliances that consume electricity provide via the main panel 808. For example, the loads 812 include appliances 818 (e.g., refrigerators, stoves, ovens, microwaves, dishwashers, washing machines, dryers, and other household appliances), lights 820 (e.g., lamps, ceiling lights, and other lighting fixtures), heating, ventilation, and air conditioning (HVAC) 822, outlets 824, water heaters, and electronics (e.g., televisions, computers, stereos, gaming consoles, and other electronic devices). The loads 812 vary in their power consumption, usually measured in watts, with higher-power loads (e.g., appliances and HVAC systems) requiring larger circuits to handle the higher current. Along the service lines or electrical wires extending from the electrical meter 806, a location or direction closer to the electrical meter 806 is generally referred to as the line side and the location or direction closer to the loads 812 is referred to as the load side.

As described above, DERs 814 allow the microgrid 804 to generate, store, and manage its electricity. DERs 814 generally enhance energy independence and lower energy costs by reducing reliance on the power grid 802. The one or more DERs 814 include solar panels 826, wind turbines 828, batteries 830, generators 832, and electric vehicles (EVs) 734.

Each DER 814 is electrically connected to the main panel 808 to receive or provide electrical power within the microgrid 804. For the described techniques and systems, each DER 814 is electrically connected to the electrical meter 806 and the main breaker 816 (or another breaker of the main panel 808) via the backup splice 110.

The techniques described herein are supportable by various configurations of the electrical system within the residential unit 804 and are not limited to the specific examples of the techniques described herein. In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

What is claimed is:

1. An apparatus comprising:

a lineside terminal and a load-side terminal electrically connected to an electrical wire via corresponding insulation-piercing tap connections that pierce an insulation of the electrical wire to contact a conductor of the electrical wire, the electrical wire including a physical break in the conductor of the electrical wire between the corresponding insulation-piercing tap connections and being electrically connected to a power grid via an electrical meter;

a relay configured to close to enable electrical connection on the electrical wire through the lineside terminal and the load-side terminal and open to disconnect one or more distributed energy resources (DERs) from the power grid in response to a controller detecting a power outage in the power grid; and the controller, operatively connected to the relay, configured to monitor a voltage of the power grid and to command the relay to open automatically in response to detecting the power outage in the power grid.

2. The apparatus of claim 1, wherein:

the electrical wire comprises one or more main service lines electrically connecting the electrical meter of a residential unit to a breaker circuit.

3. The apparatus of claim 1, wherein the apparatus is configured to gate the physical break in the conductor of the electrical wire in response to the controller detecting the electrical connection on the electrical wire through the relay.

4. The apparatus of claim 1, wherein the controller comprises a printed circuit board assembly (PCBA) operatively connected to the relay and configured to monitor a status of the relay as open or closed and measure current through the relay.

5. The apparatus of claim 4, wherein the PCBA draws power from the electrical wire.

6. The apparatus of claim 4, wherein the PCBA is configured to monitor a status of the power grid using voltage taps on a load side and a line side of the relay.

7. The apparatus of claim 4, wherein the PCBA is configured to provide metering for power flowing through the relay.

8. The apparatus of claim 4, wherein the PCBA is configured to communicate to an external power supply and provide control signals for connecting or disconnecting one or more loads in response to detecting the power outage in the power grid.

9. The apparatus of claim 1, wherein the one or more DERs are in electrical connection with the load-side terminal.

10. The apparatus of claim 1, wherein the apparatus further comprises an external override configured to command the relay to close to complete the electrical connection to the power grid.

11. The apparatus of claim 1, wherein the apparatus further comprises a wire cutter that severs the electrical wire and isolates each tap connection using a blade made of a ceramic or other nonconductive material.

12. The apparatus of claim 11, wherein a depth of the blade past a diameter of the electrical wire is:
- greater than a minimum creepage distance required by regulatory standards for the electrical wire; and
- less than the diameter of the electrical wire minus a minimum separation distance between the corresponding insulation-piercing tap connections.

13. The apparatus of claim 11, wherein:
- a depth of the blade past a diameter of the electrical wire is greater than a minimum creepage distance required by regulatory standards for the electrical wire;
- the blade and the corresponding insulation-piercing tap connections have a same starting height; and
- the insulation-piercing tap connections are driven into place by one or more break-away features that fail or break during a fastening process for the apparatus.

14. The apparatus of claim 11, wherein the apparatus is substantially formed of high-temperature rated and rigid plastic configured to press teeth of the corresponding insulation-piercing tap connections into the electrical wire.

15. A method comprising:
- electrically connecting two insulation-piercing tap connections to an electrical wire that carries electricity from a power grid, the insulation-piercing tap connections piercing an insulation of the electrical wire to contact a conductor of the electrical wire;
- electrically connecting an assembly with a lineside terminal and a load-side terminal to the insulation-piercing tap connections;
- electrically connecting an auxiliary wire connected to a distributed energy resource (DER) to the load-side terminal of the assembly, the assembly including a relay configured to close to enable electrical connection along the electrical wire via the assembly and open to disconnect the DER from the power grid; and
- physically severing the electrical wire between the two insulation-piercing tap connections such that no conductive path remains through the electrical wire between the two insulation-piercing tap connections.

16. The method of claim 15, wherein:
- the electrical wire comprises one or more main service lines electrically connecting an electrical meter of a residential unit to a breaker circuit; and
- the assembly is installed near a main electrical panel of the residential unit.

17. The method of claim 15, wherein the method further comprises:
- monitoring, using a printed circuit board assembly (PCBA), a status of the power grid using voltage taps on the load-side terminal and the lineside terminal; and
- in response to detecting a power outage in the power grid, opening the relay to disconnect the DER from the power grid.

18. The method of claim 15, wherein the method further comprises:
- positioning a first portion of the assembly on a first side of the electrical wire, the electrical wire positioned within multiple first recesses of the assembly;
- positioning the auxiliary wire into a second recess of the assembly;
- aligning a second portion of the assembly on a second side of the electrical wire to position the electrical wire and the auxiliary wire within third recesses; and
- fastening the first portion and the second portion of the assembly together to generate the two insulation-piercing tap connections and sever the electrical wire in between the two insulation-piercing tap connections.

19. The method of claim 18, wherein the fastening is configured to form the insulation-piercing tap connections before severing the electrical wire in between the insulation-piercing tap connections.

20. An assembly including:
- a wire cutter configured to sever an electrical wire within a residential unit from a power grid;
- at least two splices configured to provide an electrical connection on the electrical wire on each side of a break in the electrical wire;
- a relay configured to close to enable the electrical connection and open to disconnect one or more distributed energy resources (DERs) from the power grid; and
- a controller configured to open the relay in response to detecting a power outage in the power grid.

* * * * *